(12) United States Patent
Booher

(10) Patent No.: US 6,347,575 B1
(45) Date of Patent: Feb. 19, 2002

(54) LOW EMISSION PISTON AND RING FOR INTERNAL COMBUSTION ENGINE

(76) Inventor: Benjamin V. Booher, 11940 N. 103rd. Pl., Scottsdale, AZ (US) 85260

( * ) Notice: Subject to any disclaimer, the term of this patent is extended or adjusted under 35 U.S.C. 154(b) by 0 days.

(21) Appl. No.: 09/345,100

(22) Filed: Jun. 30, 1999

(51) Int. Cl.⁷ .............................. F16J 1/04; F02F 5/00
(52) U.S. Cl. ...................... 92/208; 277/434; 277/435; 277/447; 277/491
(58) Field of Search .................... 92/249, 212, 208; 277/434, 435, 447, 491

(56) References Cited

U.S. PATENT DOCUMENTS

| | | |
|---|---|---|
| 1,701,538 A | 2/1929 | Moore |
| 4,105,008 A | 8/1978 | Resler, Jr. ............... 133/191 R |
| 4,590,901 A | 5/1986 | Mizuhara ................ 123/193 P |
| 4,774,917 A | 10/1988 | Tokoro .................... 123/193 P |
| 5,450,783 A | 9/1995 | Binford ........................ 92/208 |

OTHER PUBLICATIONS

Thompson and Wallace. "Effect of Engine Operating Variables and Piston and Ring Parameters on Crevice Hydrocarbon Emissions". 713–736.

Saika and Korematsu, "Flame Propagation into the Ring Crevice of a Spark Ignition Engine". International Fuels and Lubricants Meeting and Exposition; Philadelphia, Pennsylvania, Oct. 6–9, 1986.

Namazian and Heywood. "Flow in the Piston–Cylinder–Ring Crevices of a Spark–Ignition Engine: Effect on Hydrocarbon Emissions, Efficiency and Power". International Congress & Exposition. Detroit, Michigan, Feb. 22–26, 1982.

*Primary Examiner*—F. Daniel Lopez
*Assistant Examiner*—Michael Leslie
(74) *Attorney, Agent, or Firm*—Freling E. Baker; Baker & Eddy

(57) ABSTRACT

A piston and compression ring combination with a piston having a generally cylindrical configuration for mounting in a cylinder of an internal combustion engine, an annular groove adjacent the top of the piston; and a piston ring having an upper inwardly directed flange adapted to rest on top of the piston, the ring having a lower inwardly retaining foot adapted for fitting into the ring groove in the piston. Such combination for the purpose of diminishing ring crevice volume, improving performance and reducing engine emissions.

28 Claims, 3 Drawing Sheets

LOW EMISSION PISTON AND RING FOR INTERNAL COMBUSTION ENGINE

BACKGROUND OF THE INVENTION

1. Field of the Invention

The present invention relates to internal combustion engines and pertains particularly to improved piston and compression ring combination for reducing emissions of pollutants, and increasing engine power and efficiency.

2. Discussion of the Related Art

The reciprocating piston internal combustion engine is perhaps the most widely used engine in the world today. However, this type of engine produces many types of harmful emissions that pollute the atmosphere. A great deal of effort has gone into the reduction of these objectionable emissions. In order to find a solution, each type of pollutant is typically treated in its own special way.

One of the major polluting emissions from spark ignition engines is unburned hydrocarbons. Unburned hydrocarbons are found in the exhaust due to a portion of the inducted fuel escaping combustion and exiting the cylinder partially or completely unoxidized. Four potential sources of the unburnt fuel that results in hydrocarbon emissions are the quenching of the combustion flame away from fuel coated chamber surfaces, premature quenching of the flame due to abnormal in-cylinder conditions, absorption of fuel by the cylinder wall oil layer, and storage of air/fuel mixture in engine ring crevices too narrow for flame propagation.

Studies have discovered that out of those four hydrocarbon sources, the dominating source is unburned fuel in engine cylinder ring crevices. In each cylinder, a top ring crevice exists between the side of the piston, the cylinder wall, and the top piston ring which forms the seal between the piston and the cylinder. During engine operation, fuel in a finely atomized state is injected into a cylinder and compressed during the up stroke of the piston. The compressed mixture is then ignited creating an explosion which forces the piston down generating power. However, in engines with a typical ring configuration, some of the fuel air mixture is trapped in the top ring crevice and some of the fuel spray adheres to the relatively cooler cylinder wall in the crevice. During combustion, because the top ring crevice is too narrow for the flame to enter, the fuel air mixture and the fuel spray in the crevice is not burned as effectively as that above the piston head. As a result, part of the cylinder charge escapes the normal engine combustion process thereby producing unburned hydrocarbons and preventing that portion of fuel from being converted into engine power. Numerous studies have concluded that the impact of this flow of cylinder gases into and out of the top ring crevices, on unburned hydrocarbons and engine efficiency and power, is significant. Therefore, an engine with such ring crevices has less fuel efficiency, less power, and higher exhaust hydrocarbon emissions than an engine without the crevices.

For instance, N. Namazian and J. B. Heywood, "Flow in the Piston-Cylinder-Ring Crevices of a Spark-Ignition Engine: Effect on Hydrocarbon Emissions, Efficiency and Power," SAE paper 820088, 1982, a study of the fraction of the crevice gas which is unburned, shows that depending on spark plug and ring gap location, between 4 and 8 percent of the induced fuel-air mixture escapes the primary combustion process. Between 0.5 and 1.2 percent of this percentage is blowby through a gap in the rings structure which is necessary for mounting the ring on the piston. The study further demonstrates that reduction in pistontop-land crevice-volume has a significant effect on the unburned fuel returning to the cylinder. In one SAE test engine, if the top land crevice volume is removed, a 70% reduction in hydrocarbons returning to the combustion chamber would be achieved. Similarly, J. T. Wentworth, "The Piston Crevice Volume Effect on Exhaust Hydrocarbon Emissions", Combustion Science and Technology, Vol. 4, pp. 97–100, 1971, observes about a 50 percent reduction in exhaust hydrocarbons emissions when the total piston-cylinder crevice volume was virtually eliminated. Furthermore, the Namazian study shows that the crevice gas flow represents a significant power and efficiency loss. Depending on the degree and rate of in cylinder oxidation, and design and operating details, these losses are at least 2 to 7 percent.

Various proposals have been made to eliminate hydrocarbon emissions associated with the ring crevice. T. Saika and K. Korematsu, "Flame Propagation into the Ring Crevice of a Spark Ignition Engine," SAE paper 861528, 1986, proposes a ring crevice design that has a wider clearance between the piston and cylinder into which the flame propagates in order to reduce the amount of unburnt fuel. However, by decreasing the amount of unburnt fuel air mixture, this design only partially reduces those hydrocarbon emissions associated with the ring crevice. Further, this design could diminish engine life due to the burning of piston edges. Alternatively, M. Willcock, D. H. Tidmarsh, P. Foss and D. Bates, "A Comparison of Hydrocarbon Emissions from Different Piston Designs in an S1 Engine," SAE paper 930714, 1993, proposes reducing the ring crevice height by moving the top piston ring closer to the piston top in order to reduce hydrocarbon emissions. Nevertheless, this design only partly reduces hydrocarbon emissions by reducing the ring crevice 35% in volume.

In order to prevent the top of a piston from burning and to reduce friction between the piston rings and cylinder wall, U.S. Pat. No. 4,774,917, discloses an inclined piston groove with the inner part of the groove lower than its outer edges and a piston ring mounted in this groove and extending vertically to nearly the top of the piston. However, this design requires that the distance between the piston and cylinder wall be less than the width of the vertical portion of the piston ring. The resulting gap allows gasses and unburnt fuel to leak below this top ring resulting in more pollution, and less efficiency and power than a piston without this gap.

U.S. Pat. No. 5,450,783, discloses a single strip piston ring with a horizontally symmetrical cross section for engaging two grooves in a pistons upper edge. The ring has two wedge shaped legs for engaging two wedge shaped grooves in the piston. The grooves are separated so that there is a tapering protrusion created between them. During use, this tapering protrusion's wedged shaped causes the upward and downward forces on the ring to produce a dynamic force pressing the ring against the cylinder wall. Thus, the energy required to overcome the force pressing the ring against the cylinder wall causes the piston to be less efficient and have less power than a "dead ring" or piston/ring design that does not create the dynamic outward ring force.

There exists, therefore, an established and significant need to reduce harmful exhaust hydrocarbon emissions from spark ignition engines without loss of power and fuel efficiency, particularly with respect to emissions resulting from unburnt fuel in engine cylinder crevices. It is therefore desirable to have an improved piston and compression ring combination with an upper flange and sealing surface exposed to combustion to reduce or eliminate cylinder crevices thereby reducing pollutant emissions, while increasing engine power and efficiency. The present invention fulfills all of these needs and provides further related advantages.

SUMMARY AND OBJECTS OF THE INVENTION

It is the primary object of the present invention to provide an improved internal combustion engine piston and compression ring construction that reduces or eliminates the crevice around the top of a piston, thereby lowering hydrocarbon emissions while increasing engine power and efficiency.

One embodiment of the invention provides a compression ring having a generally annular configuration with an upper inwardly directed flange, a radially outwardly directed sealing surface adapted to engage an inner surface of a cylinder, a downwardly depending skirt portion, and a retaining foot extending radially from a lower portion of the skirt.

A preferred embodiment of the present invention provides a compression ring having a generally annular configuration with an upper inwardly directed flange overlaying the upper end of a piston. The ring has a radially outwardly directed surface forming a seal against the inside of the engine cylinder. A downwardly depending skirt portion of the ring ends in a retaining foot that extends radially inward engaging an annular groove around the outside of the piston.

Another embodiment provides an improved piston ring construction having an annular configuration with an upper inwardly directed flange overlaying the upper end of a piston, an outwardly directed sealing flange, and a downwardly depending skirt portion ending in a retaining foot that is extended into a groove in the upper surface of the piston.

BRIEF DESCRIPTION OF THE DRAWINGS

The nature, goals, and advantages of the invention will become apparent to those skilled in the art after considering the following detailed description when read in connection with the accompanying drawings—illustrating by way of examples the principles of the invention—in which like reference numerals identify like elements throughout, wherein.

DETAILED DESCRIPTION OF THE PREFERRED EMBODIMENTS

The present invention solves the problem of polluting hydrocarbon emissions, and loss of efficiency and power from an internal combustion engine having top ring crevices between each piston and cylinder. The present invention provides a piston and ring design which seals off the piston cylinder crevice at or near the top of the piston, significantly reducing the amount of fuel air mixture left unburnt in the cylinder after combustion. Further, the invention provides additional engine efficiency and power because its "dead ring" design does not create a dynamic force pressing the ring against the cylinder wall.

Throughout this description, the preferred embodiment and examples shown should be considered as exemplars, rather than limitations on the present invention.

Figure 1:
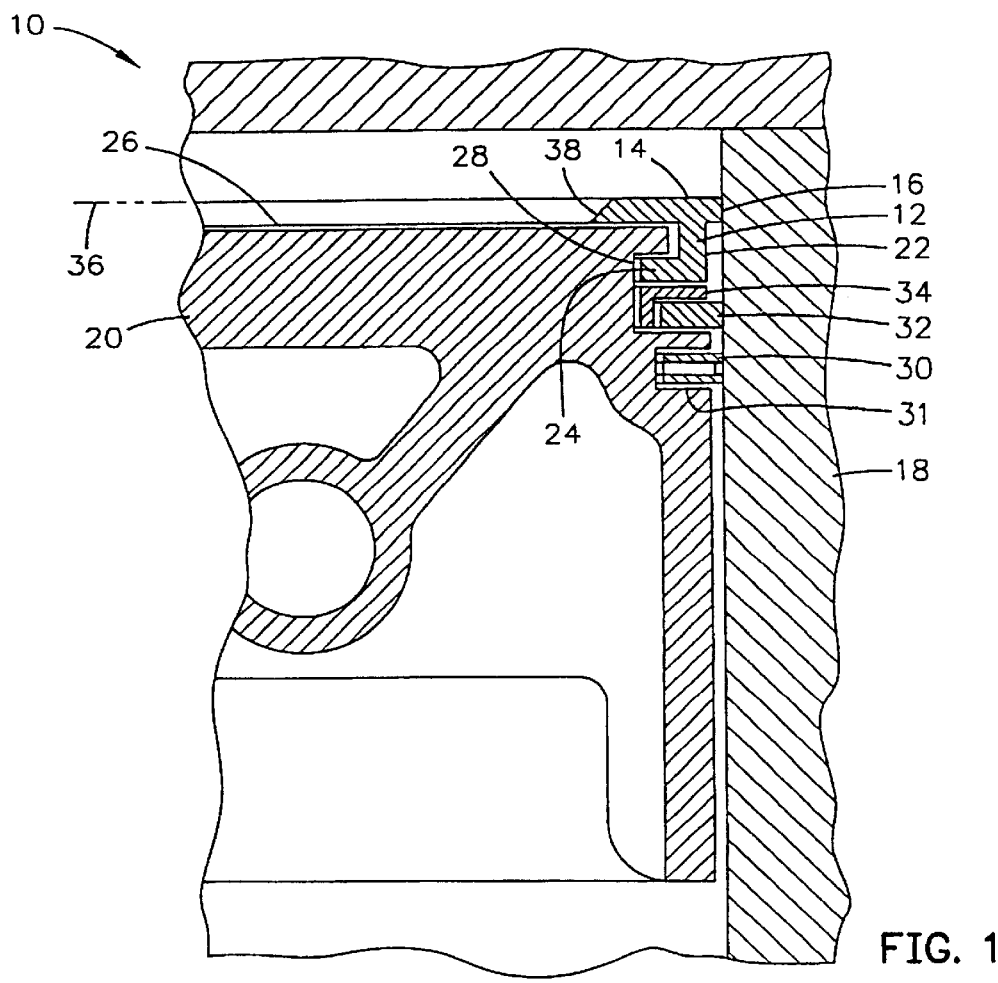
FIG. 1 is a cross-sectional view of a first embodiment of the present invention, showing a piston and piston rings with the top piston ring inward directed flange resting on the piston top; the radially outward directed sealing surface in contact with the cylinder wall; a downwardly depending skirt portion; and a retaining foot extended into and sharing with other rings, a groove on the outer surface of the piston.

Referring to the drawings where like elements are identified with like reference numerals, an exemplary embodiment of an improved piston and ring construction in accordance with one embodiment of the invention is illustrated in FIG. 1 and is designated generally by the numeral 10. As illustrated, the invention provides an improved top piston compression ring construction 12 having a generally annular configuration with an upper inwardly directed flange 14 and a radially outwardly directed sealing surface 16 exposed to combustion. The ring's outward directed sealing surface 16 is adapted to engage an inner surface of a cylinder 18. Downwardly depending from the flange is a skirt portion 22. A retaining foot 24 extends radially from a lower portion of the skirt. FIG. 1 is a cross-section of the piston 20 which has a generally cylindrical configuration for mounting in a cylinder of an internal combustion engine, and the top and secondary piston rings. The top ring's upper inwardly directed flange 14 may be adapted to rest on the top of or to overly the top of a piston 26 and the retaining foot may be adapted to extend into an annular groove 28 around the outer surface of the piston, near its top. The top ring will generally have an asymmetrical horizontal cross-section, however, where the inwardly directed flange overlays the top of the piston surface 26, the retaining foot and sealing surface may be designed so that there is a horizontal symmetrical cross section.

The ring retaining foot 24 and piston groove 28 may be designed so that the top ring foot 24 shares the groove with a second compression ring 32 or rings and/or bushing 34 shown in FIG. 1. A bushing 34 may be used between the two compression rings to isolate them from each other so that they will react independently to the piston's motion. This adaptation demonstrates manufacturing and cost efficiencies in applying the advantages of the top ring invention. Furthermore, traditional oil rings 30 may be implemented in appropriately spaced grooves 31 in the outer surface of the piston.

Figure 2:
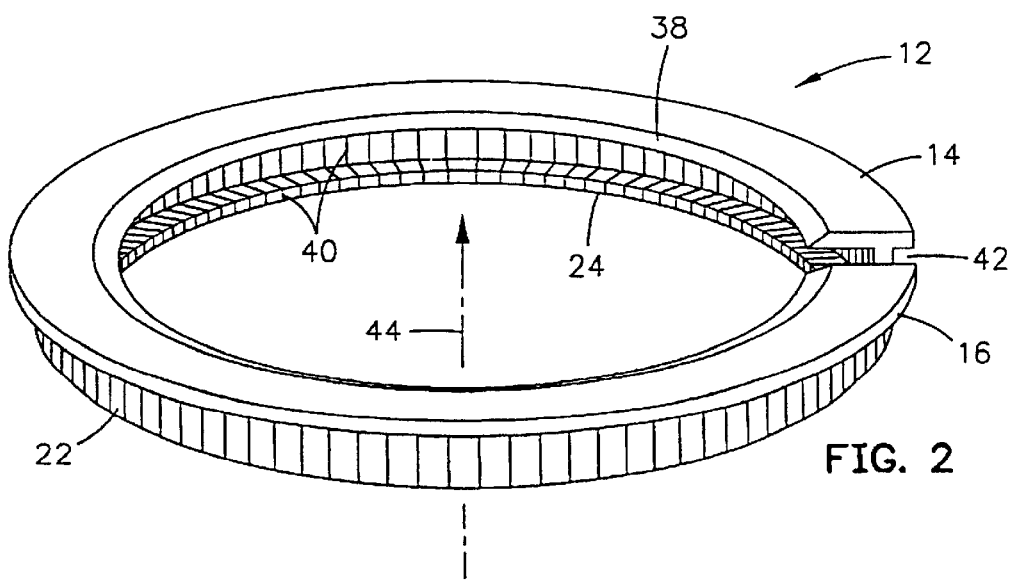
FIG. 2 is a perspective view of the top piston ring of FIG. 1.

In the embodiment shown in FIG. 2, the downwardly depending skirt portion 22 and retaining foot 24 are segmented 40. As shown, the top portion of the ring is contiguous with a solid top flange 114 and sealing surface 116, but the skirt 122 and retaining foot 124 are cut at equally spaced intervals. Optionally, the skirt may be solid as well, leaving only the retaining foot segmented. The segmented portions allow the ring to establish retaining mass while eliminating a "compression rate" increase inherent to increased cross-sectional mass. Alternatively, the ring can be formed with a total contiguous geometry where the top flange 114, sealing surface 116, skirt 122, and retaining foot 124 are all solid.

The piston ring gap 42 which allows the ring to be expanded during placement on the piston is also shown in FIG. 2. Both FIGS. 1 and 2 show the ring 12 with the radially outwardly directed sealing surface 16 as an outwardly directed flanged extension of the upper inwardly directed flange 14. Similarly, FIGS. 1 and 2 show the skirt 22 extending parallel to the axis of the ring; and the retaining foot 24 extending inward toward the ring axis adapted to extend into a groove 28 on an outer surface of a piston. However, neither a segmented skirt and retaining foot, a flange extension type sealing surface, nor a skirt parallel to the ring axis are required. For instance, the sealing surface 16 may extend down from a common plane 36 of an upper surface of the inwardly directed flange as shown in FIG. 1. Also, if necessary the sealing surface may extend downwardly from the plane 36, to as far as the bottom of the skirt, or longer in order to provide a sufficient seal. Optionally, the sealing surface may begin and end at any point along the skirt in order to provide a sufficient seal. FIGS. 1 and 2 also show the inner edge 38 of the upper inwardly directed flange tapering from its upper surface to its lower surface. This inner edge may be tapered at varying degrees, vertical, or of any other suitable profile.

Figure 3:
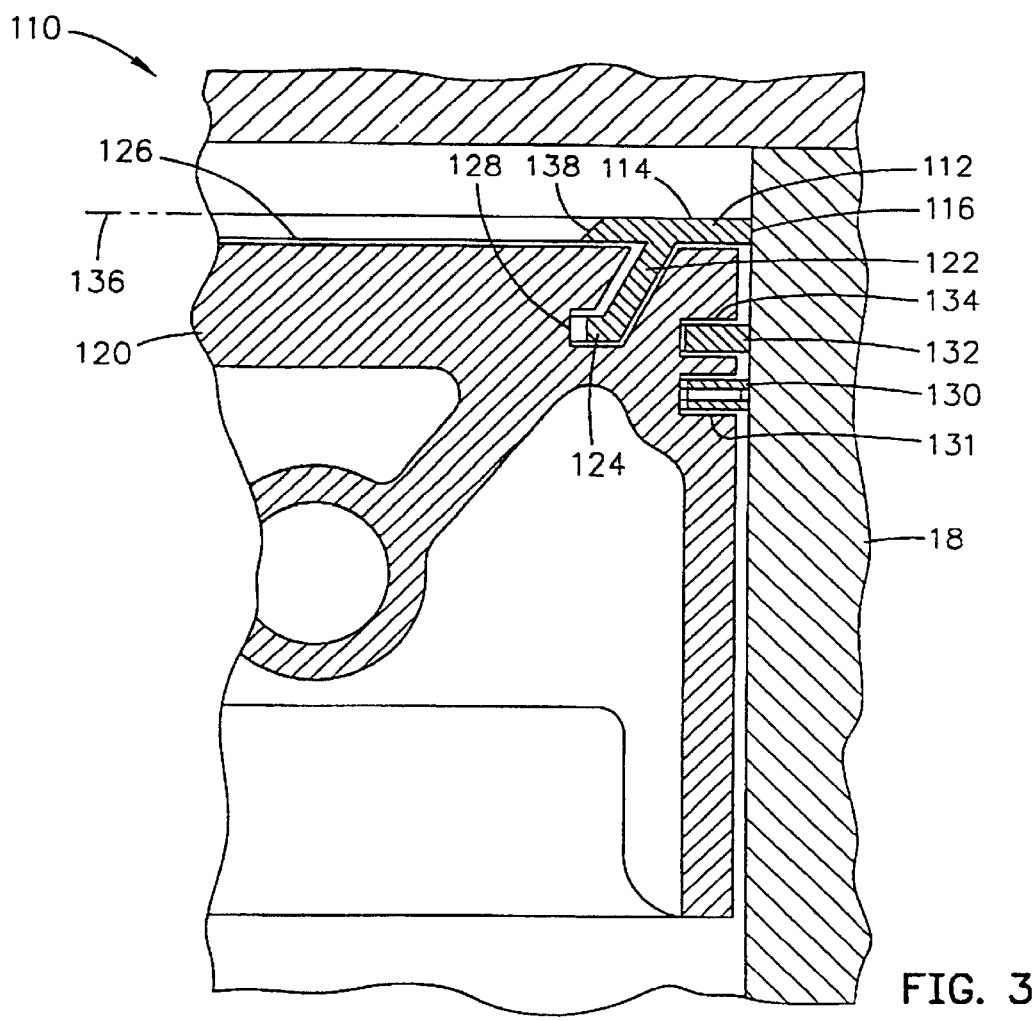
FIG. 3 is a cross-sectional view of a second embodiment of the present invention, showing a piston and piston rings with the top piston ring inward directed flange resting on the piston top, a radially outward directed flange sealing surface in contact with the cylinder wall, a downwardly depending skirt portion; and a retaining foot extended into a groove on the top surface of the piston.

FIG. 3 shows an alternate embodiment of the improved piston and ring construction 10 with the improved top piston compression ring construction 112 having a generally annular configuration with an upper inwardly directed flange 114 and a radially outwardly directed sealing surface 116 exposed to combustion. Downwardly depending from the flange is a skirt portion 122 with a retaining foot 124 extending radially from a lower portion of the skirt. However, one difference between the previous embodiments and this one is that here both the skirt portion and retaining foot are adapted to extend into a groove 128 in an upper surface of a piston as shown in FIG. 3. This mounting of the top ring into a groove in the top of the piston allows traditional inclusion of the second compression, and oil rings in the piston outer surface grooves which may provide some advantage in retaining the piston's mass near the outer edge, as is required to insure dependability and retention of the secondary rings.

In addition, FIG. 3 shows the upper inwardly directed flange resting on the top 126 of a piston; the outwardly directed sealing surface 116 as an outwardly directed radial flange; the downward depending skirt portion 122 extending radially inward towards the axis of the ring 144; and the retaining foot 124 extending inward, parallel to the piston top surface 26. However, it is also possible for the downward depending skirt 122 to extend outward away from the piston ring axis 144 and the retaining foot 124 to extend inward toward the axis of the ring. Another option is to have the downward depending skirt to extend inward towards the axis and the retaining foot to extend outwards away from the axis. FIG. 3 also shows the secondary compression ring 132 in its own groove 134 and oil ring 130 in its own groove 131 in the outer surface of the piston.

Figure 4:
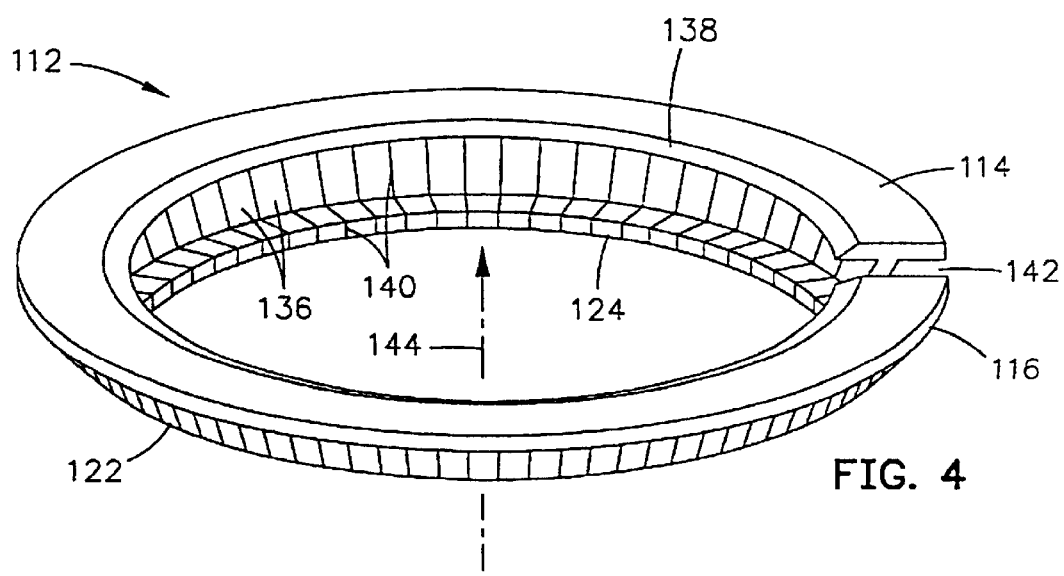
FIG. 4 is a perspective view of the top piston ring of FIG. 3.

FIG. 4 shows an embodiment of the ring in FIG. 3, where the downwardly depending skirt portion 122 and retaining foot 124 are segmented 140. The piston ring gap 142 which allows the ring to be expanded for placement on the piston is also shown in FIG. 4. Both FIGS. 3 and 4 both show the ring 112 with the radially outwardly directed sealing surface 116 as an outwardly directed flanged extension. It is possible for the sealing surface 116 to extend downward, from a common plane 136 of an upper surface of the flange, to below the piston top surface 126 in order to provide a sufficient seal. FIGS. 3 and 4 also show the inner edge 138 of the upper inwardly directed flange tapering from its upper surface to its bottom surface. This inner edge may be tapered at varying degrees, vertical, or of any other suitable profile.

Figure 5:
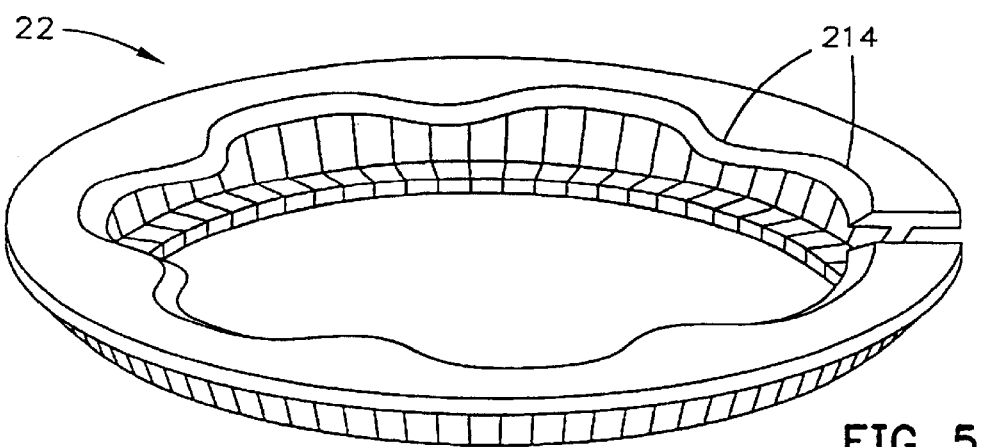
FIG. 5 is a perspective view of the top piston ring of FIG. 3 with a reduced ring mass geometry.

FIG. 5 shows an embodiment having a reduced mass geometry ring 212 where the ring's upper flange has a reduced mass geometry 214 in an inwardly radial pattern (Compare with ring in FIG. 4). This reduced mass upper flange can be implemented with top rings having either a retaining foot (24 FIG. 1) for engaging a groove in the outer surface of a piston (28 FIG. 1), or top rings having a retaining foot (124 FIG. 3) for engaging a groove in a piston top (128 FIG. 3). The reduced mass geometry achieves more specific mechanical properties, such as reduction of the "spring/compression rate" of the top ring. Reduction of the ring's inwardly directed flange mass may be accomplished by cutting away part of the flange or forming the flange with some sections having less inward extension than others.

Figure 6:
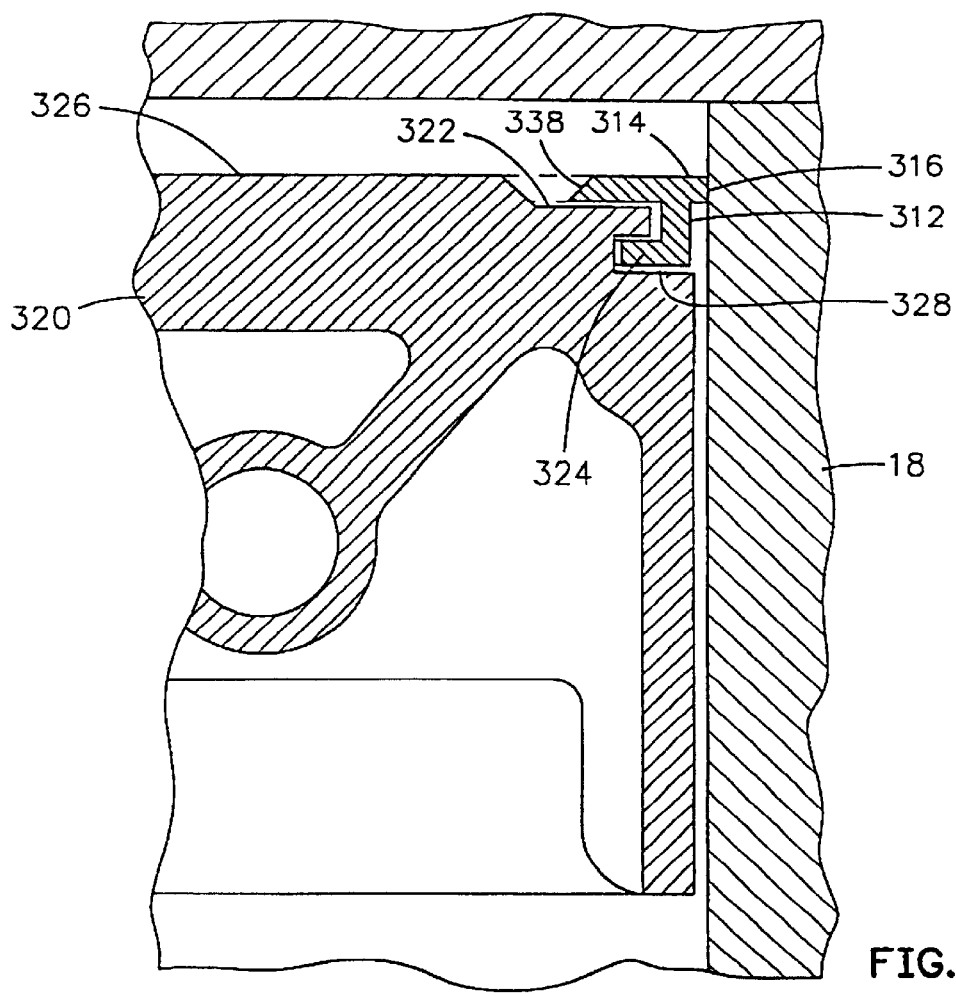
FIG. 6 is a cross-sectional view of another embodiment of the present invention, showing a piston and piston rings with the top piston ring inward directed flange resting in a stepped down surface of the piston top and with the top piston ring retaining foot extended, by itself, into a groove on the outer surface of the piston.

In an optional embodiment, as shown in FIG. 6, the top piston ring 312 inward directed flange 314 rests in an annular stepped down surface 322 of the piston top 326. Note that this stepped down piston surface 322 design is possible with top rings 12 having either a retaining foot for engaging a groove 328 in the outer surface of a piston as shown in FIG. 6, or top rings having a retaining foot (124 FIG. 3) for engaging a groove in a piston top (128 FIG. 3). FIG. 6 also shows the inwardly directed flange top 314 and sealing surface 316 top surfaces flush with the piston top 326. However, the piston top 326 may extend above either or both of these surfaces. Alternatively, these surfaces may extend above the piston top. Similarly, FIG. 6 shows the inner edge 338 of the ring's upper flange 314 and the edge between the piston top and stepped down surface 340 tapering downward from the rings upper surface to its lower surface. Alternatively, these shapes may be tapered at varying degrees and directions, vertical, or of any other suitable profile.

FIG. 6 also shows the top ring retaining foot 324 extending alone into the piston top groove 328. Nevertheless, secondary compression rings (See 132 FIG. 3) may reside in independent grooves (See 134 FIG. 3) as ring position and geometry allow so that mechanical properties of the top ring may be within an ordinary or desirable range compared to traditional rings.

A further benefit of the invention is the prevention of burning of the piston edges because the edges are shielded from the combustion by the top ring. Another benefit, is the invention's "dead ring" design which prevents top ring dynamic forces translating into radial outward forces creating ring friction against the cylinder which requires energy to overcome. An additional benefit of the invention is an increase in piston head surface by the area which would be the top ring gap, but is now sealed off at the piston top by the top ring.

Other Embodiments

Certain preferred embodiments have been described above. It is to be understood that a latitude of modification and substitution is intended in the foregoing disclosure, and that these modifications and substitutions are within the literal scope—or are equivalent to—the claims that follow.

Accordingly, it is appropriate that the following claims be construed broadly and in a manner consistent with the spirit and scope of the invention herein described.

I claim:

1. A compression ring for use in combination with a piston in an internal combustion engine, the ring comprising:
   a body having a generally annular configuration with an upper inwardly directed flange,
   said flange having a reduced mass geometry in an inwardly radial pattern;
   a radially outwardly directed sealing surface adapted to engage an inner surface of a cylinder;
   a downwardly depending skirt portion; and
   a retaining foot extending radially from a lower portion of said skirt.

2. A compression ring for use in combination with a piston in an internal combustion engine, the ring comprising:
   a body having a generally annular configuration with an upper inwardly directed flange;
   a radially outwardly directed sealing surface adapted to engage an inner surface of a cylinder;
   a downwardly depending skirt portion; and
   a retaining foot extending radially from a lower portion of said skirt, wherein said retaining foot is adapted to extend into and share with at least one other piston ring, a groove on an outer surface of a piston.

3. A compression ring for use in combination with a piston in an internal combustion engine, the ring comprising:
   a body having a generally annular configuration with an upper inwardly directed flange; a radially outwardly directed sealing surface adapted to engage an inner surface of a cylinder, wherein said radially outwardly directed sealing surface extends down from a common plane of a upper surface of said upper inwardly directed flange;
   a downwardly depending skirt portion; and
   a retaining foot extending radially from a lower portion of said skirt.

4. A compression ring according to claim 3 wherein:
   said upper inwardly directed flange rests on a top of a piston.

5. A compression ring according to claim 3 wherein:
   said ring has an asymmetrical cross-section.

6. A compression ring according to claim 3 wherein said retaining foot is adapted to extend by itself into a groove on an outer surface of a piston.

7. A compression ring according to claim 3 wherein:
   said upper inwardly directed flange is adapted to rest in a stepped down surface of a piston top.

8. A compression ring according to claim 3 wherein:
   said skirt extends parallel to the axis of the ring; and
   said retaining foot extends inward toward the axis.

9. A compression ring according to claim 8 wherein:
   said skirt is adapted to extend into the crevice formed between an outer surface of a piston and an inner surface of a cylinder; and
   said retaining foot is adapted to extend into a groove in an outer surface of a piston.

10. A compression ring according to claim 9 wherein said radially outwardly directed sealing surface is an outwardly directed flanged extension of said upper inwardly directed flange.

11. A compression ring for use in combination with a piston in an internal combustion engine, the ring comprising:
    a body having a generally annular configuration with an upper inwardly directed flange; a radially outwardly directed sealing surface adapted to engage an inner surface of a cylinder,
    a downwardly depending skirt portion; and
    a retaining foot extending radially from a lower portion of said skirt, wherein said downwardly depending skirt portion and said retaining foot are segmented.

12. A compression ring according to claim 11 wherein:
    said skirt extends parallel to the axis of the ring; and
    said retaining foot extends inward toward the axis and is adapted to extend into a groove on an outer surface of a piston.

13. A compression ring for use in combination with a piston in an internal combustion engine, the ring comprising:
    a body having a generally annular configuration with an upper inwardly directed flange;
    a radially outwardly directed sealing surface adapted to engage an inner surface of a cylinder;
    a downwardly depending skirt portion; and
    a retaining foot extending radially from a lower portion of said skirt, wherein said retaining foot is adapted to extend into a groove in an upper surface of a piston.

14. A compression ring according to claim 13 wherein:
    an outwardly directed flange forms said radially outwardly directed sealing surface;

said skirt extends outward away from the axis of the ring; and said retaining foot extends inward toward the axis.

15. A compression ring according to claim 13 wherein:

an outwardly directed flange forms said radially outwardly directed sealing surface;

said skirt extends inward toward the axis of the ring; and said retaining foot extends inward toward the axis.

16. A compression ring according to claim 13 wherein said downwardly depending skirt portion and said retaining foot are segmented.

17. A compression ring or use in combination with a piston in an internal combustion engine, the ring comprising:

a body having a generally annular configuration with an upper inwardly directed flange adapted to overlie an upper end of a piston;

a radially outwardly directed sealing surface adapted to engage an inner surface of a cylinder, wherein said radially outwardly directed sealing surface extends down from a common plane with an upper surface of said upper inwardly directed flange;

a downwardly depending skirt portion; and a retaining foot extending radially from a lower portion of said skirt adapted to engage within an annular groove in a piston.

18. A compression ring according to claim 17 wherein:

said skirt extends parallel to the axis of the ring; and said retaining foot extends inward toward the axis.

19. A compression ring according to claim 17 wherein said downwardly depending skirt portion and said retaining foot are segmented.

20. A compression ring according to claim 17 wherein said retaining foot is adapted to extend into a groove in an upper surface of a piston.

21. A compression ring according to claim 20 wherein:

an outwardly directed flange forms said radially outwardly directed sealing surface;

said skirt extends outward away from the axis of the ring; and said retaining foot extends inward toward the axis.

22. A compression ring according to claim 21 wherein said downwardly depending skirt portion and said retaining foot are segmented.

23. A piston and compression ring combination, comprising:

a piston having a generally cylindrical configuration for mounting in a cylinder of an internal combustion engine;

an annular groove adjacent the top of the piston; and a piston ring having an upper inwardly directed flange adapted to rest on a top surface of the piston, a radially outwardly directed sealing surface adapted to engage an inner surface of said cylinder, wherein said radially outwardly directed sealing surface extends down from a common plane with an upper surface of said upper inwardly directed flange;

a downwardly depending skirt portion; and the ring having a lower inwardly retaining foot adapted for fitting into said annular groove of said piston.

24. A piston and compression ring according to claim 23 wherein:

said skirt extends parallel to the axis of the ring; and said retaining foot extends inward toward the axis.

25. A piston and compression ring according to claim 23 wherein said downwardly depending skirt portion and said retaining foot are segmented.

26. A piston and compression ring according to claim 23 wherein said retaining foot is adapted to extend into a groove in an upper surface of a piston.

27. A piston and compression ring according to claim 26 wherein:

an outwardly directed flange forms said radially outwardly directed sealing surface;

said skirt extends outward away from the axis of the ring; and said retaining foot extends inward toward the axis.

28. A piston and compression ring according to claim 27 wherein said downwardly depending skirt portion and said retaining foot are segmented.

* * * * *